(12) United States Patent
Yoshikawa

(10) Patent No.: US 9,000,327 B2
(45) Date of Patent: Apr. 7, 2015

(54) LASER WELDING METHOD AND LASER WELDING SYSTEM

(75) Inventor: Nobuhiro Yoshikawa, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 1913 days.

(21) Appl. No.: 11/916,063

(22) PCT Filed: Sep. 29, 2006

(86) PCT No.: PCT/IB2006/002712
§ 371 (c)(1),
(2), (4) Date: Nov. 30, 2007

(87) PCT Pub. No.: WO2007/036797
PCT Pub. Date: Apr. 5, 2007

(65) Prior Publication Data
US 2008/0223831 A1 Sep. 18, 2008

(30) Foreign Application Priority Data

Sep. 30, 2005 (JP) .................................. 2005-289161
Jun. 9, 2006 (JP) .................................. 2006-161360

(51) Int. Cl.
*B23K 26/00* (2014.01)
*B23K 26/04* (2014.01)
*B23K 26/20* (2014.01)
(Continued)

(52) U.S. Cl.
CPC .............. *B23K 26/20* (2013.01); *B23K 26/073* (2013.01); *B23K 26/0807* (2013.01); *B23K 26/0884* (2013.01)

(58) Field of Classification Search
USPC .............. 219/121.6, 121.63, 121.64, 121.65, 219/121.73, 121.74, 121.75, 121.78, 219/121.79, 121.8, 121.81, 121.82, 121.85
See application file for complete search history.

(56) References Cited

U.S. PATENT DOCUMENTS 4,931,125 A * 6/1990 Volkmann et al. .......... 156/272.8
5,026,967 A * 6/1991 Bell et al. ................. 219/121.64
7,292,910 B2 11/2007 Gmeiner (Continued)

FOREIGN PATENT DOCUMENTS

EP 1424613 A1 6/2004
EP 1671740 A1 6/2006

(Continued)

OTHER PUBLICATIONS

An English translation of the Japanese Office Action of corresponding Japanese Application No. JP 2006-161360, dated Nov. 9, 2011, mailed Nov. 15, 2011.

*Primary Examiner* — Dana Ross
*Assistant Examiner* — John J Norton
(74) *Attorney, Agent, or Firm* — Global IP Counselors, LLP

(57) ABSTRACT

A focal point controlling section is configured and arranged to control a focal point of the laser beam outputted from a laser oscillator to selectively focus the laser beam on a surface of a workpiece. A laser irradiation position moving section is configured to move a laser irradiation position at which the laser beam strikes on the surface of the workpiece. A control unit is configured to change a heat amount imparted on the surface of the workpiece to switch between a welding state and a non-welding state by controlling at least one of the focal point controlling section and the laser irradiation position moving section while controlling the laser oscillator to continuously output the laser beam before and after switching between the welding state and the non-welding state.

14 Claims, 11 Drawing Sheets

(51) Int. Cl.
*B23K 26/073* (2006.01)
*B23K 26/08* (2014.01)

(56) References Cited

U.S. PATENT DOCUMENTS

| | | | |
|---|---|---|---|
| 2002/0144984 A1* | 10/2002 | Mori et al. | 219/121.64 |
| 2004/0111185 A1* | 6/2004 | Gmeiner | 700/245 |
| 2004/0182836 A1* | 9/2004 | Becker et al. | 219/121.64 |
| 2006/0138101 A1* | 6/2006 | Zauner et al. | 219/121.64 |
| 2006/0144826 A1* | 7/2006 | Becker et al. | 219/121.64 |
| 2006/0226128 A1* | 10/2006 | Otsuka et al. | 219/121.64 |
| 2006/0249486 A1* | 11/2006 | Rippl | 219/121.63 |

FOREIGN PATENT DOCUMENTS

| | | | |
|---|---|---|---|
| EP | 1710040 A2 | | 10/2006 |
| JP | 57009593 A | * | 1/1982 |
| JP | S57-009593 A | | 1/1982 |
| JP | H09-192869 A | | 7/1997 |
| JP | 2003-251481 | | 9/2003 |

* cited by examiner

LASER WELDING METHOD AND LASER WELDING SYSTEM

CROSS-REFERENCE TO RELATED APPLICATIONS

This U.S. National stage application claims priority to Japanese Patent Application Nos. 2005-289161, filed in Japan on Sep. 30, 2005 and 2006-161360, filed in Japan on Jun. 9, 2006. The entire disclosures of Japanese Patent Application Nos. 2005-289161 and 2006-161360 are hereby incorporated herein by reference.

BACKGROUND OF THE INVENTION

1. Field of the Invention

The present invention relates to a laser welding method and a laser welding system.

2. Background Information

Conventionally, certain types of welding have been conducted using moving devices. In recent years, laser welding is also being conducted using moving devices. Such laser welding is conducted using a laser processing head having a lens or a mirror configured and arranged to focus a laser beam onto a surface of a workpiece. The processing head is configured and arranged to shine the laser beam onto the surface of the workpiece while being moved by a moving device. The laser beam welds the workpiece by imparting a prescribed amount of heat to the workpiece. Japanese Laid-Open Patent Publication No. 2003-251481 discloses such conventional laser welding system in which the moving device is temporarily stopped at a welding start point and a welding end point in order to position the laser processing head (i.e., to position the laser beam) with respect to a welding position, and the laser output of a laser oscillator is turned on in response to a synchronization signal from the moving device. When the laser output is turned on, the moving device is accelerating from the stop state and has not reached the speed required for welding. Thus, if welding is conducted at the beginning of the laser welding in the same manner as when the required speed has already been reached, the welding state will become unstable due to a severely high-output laser beam being shone onto a small surface area. Therefore, in the conventional laser welding system, for example, the waveform of the laser output is controlled in an attempt to stabilize the weld quality at the bead ends.

In view of the above, it will be apparent to those skilled in the art from this disclosure that there exists a need for an improved laser welding method and laser welding system. This invention addresses this need in the art as well as other needs, which will become apparent to those skilled in the art from this disclosure.

SUMMARY OF THE INVENTION

With the conventional laser welding system disclosed in the above mentioned reference, the laser output is controlled in synchronization with the moving device in order to control the weld quality while the moving device is accelerating. Since the movement speed of the accelerating laser processing head varies depending on the path and speed of the moving device, the laser output needs to be controlled in accordance with the variations of the movement speed of the laser processing head. Consequently, portions of the edges (the welding start point and the welding end point) of the weld ultimately suffer from unstable quality in the conventional laser welding system. Moreover, since the laser oscillator outputs the laser beam in response to a signal (laser output signal) from the moving device in the conventional laser welding system, it is necessary to provide a waiting time until the laser output stabilizes because a time delay occurs between when the signal is issued and when the signal is received.

However, if the laser is outputted without stopping the moving device for positioning in an attempt to resolve the problems just described, the laser emission will be delayed and/or inconsistent with respect to the movement speed and the movement path of the moving device because the output timing of the laser output signal from the moving device varies depending on the movement speed and path of the moving device and the laser beam is generated after the laser output signal is transmitted to the laser oscillator.

In view of these problems, one object of the present invention is to provide a laser welding method and laser welding system with which the quality of the welds produced does not depend on controlling the output of the laser oscillator and the starting and ending positions of the welds can be processed with high quality.

In order to achieve the above object, a laser welding method is provided that basically comprises controlling a focal point of a laser beam outputted from a laser oscillator to selectively focus the laser beam on a welding surface of a workpiece; moving a laser irradiation position at which the laser beam strikes on the welding surface of the workpiece; and selectively switching between a welding state and a non-welding state by gradually changing an amount of heat imparted on the welding surface of the workpiece by at least one of the controlling of the focal point and the moving of the laser irradiation position while continuously outputting the laser beam from the laser oscillator before and after the switching between the welding state and the non-welding state.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
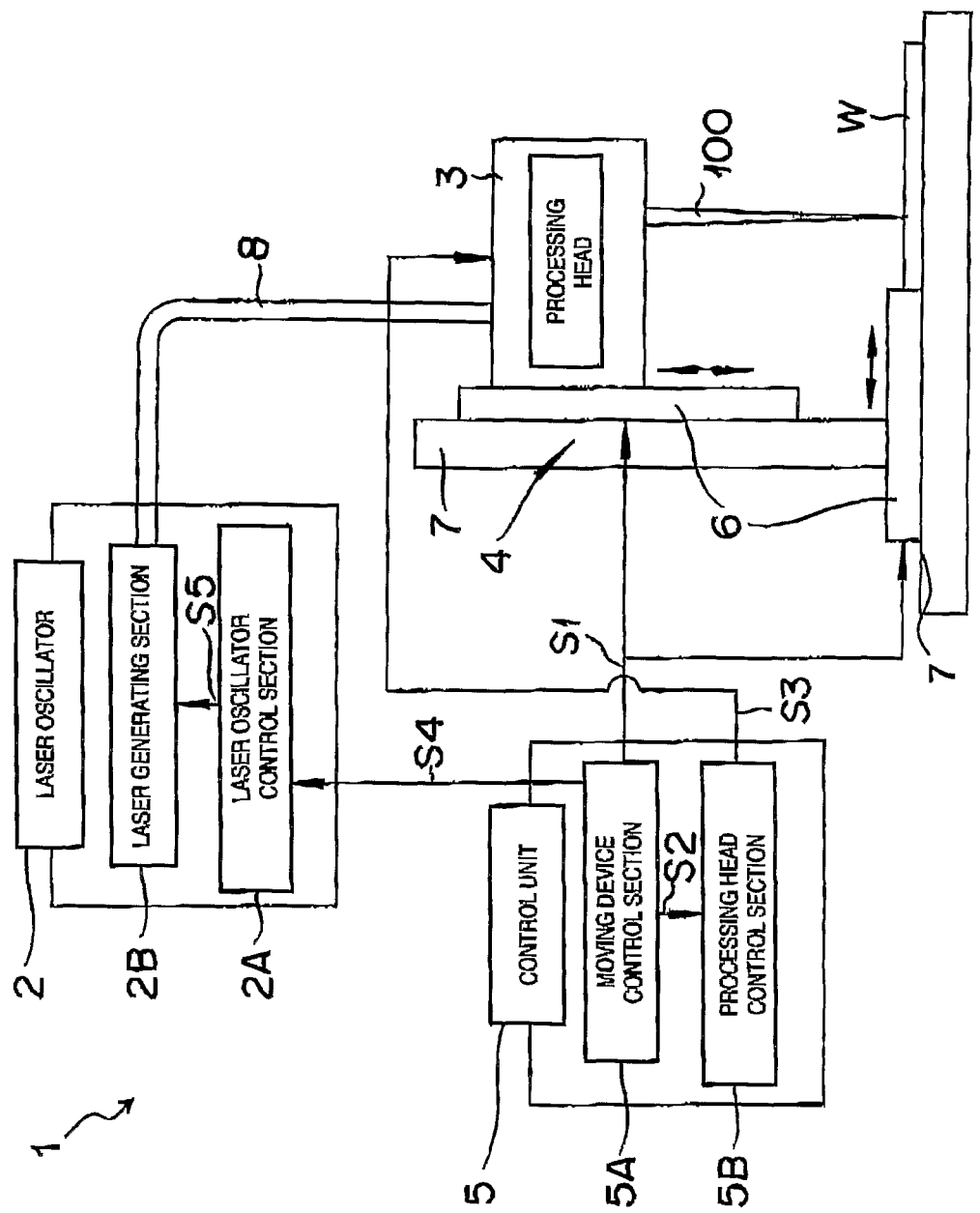
FIG. 1 is a simplified schematic diagram of a laser welding system in which a laser welding method is used in accordance with a first embodiment of the present invention.
Figure 2:
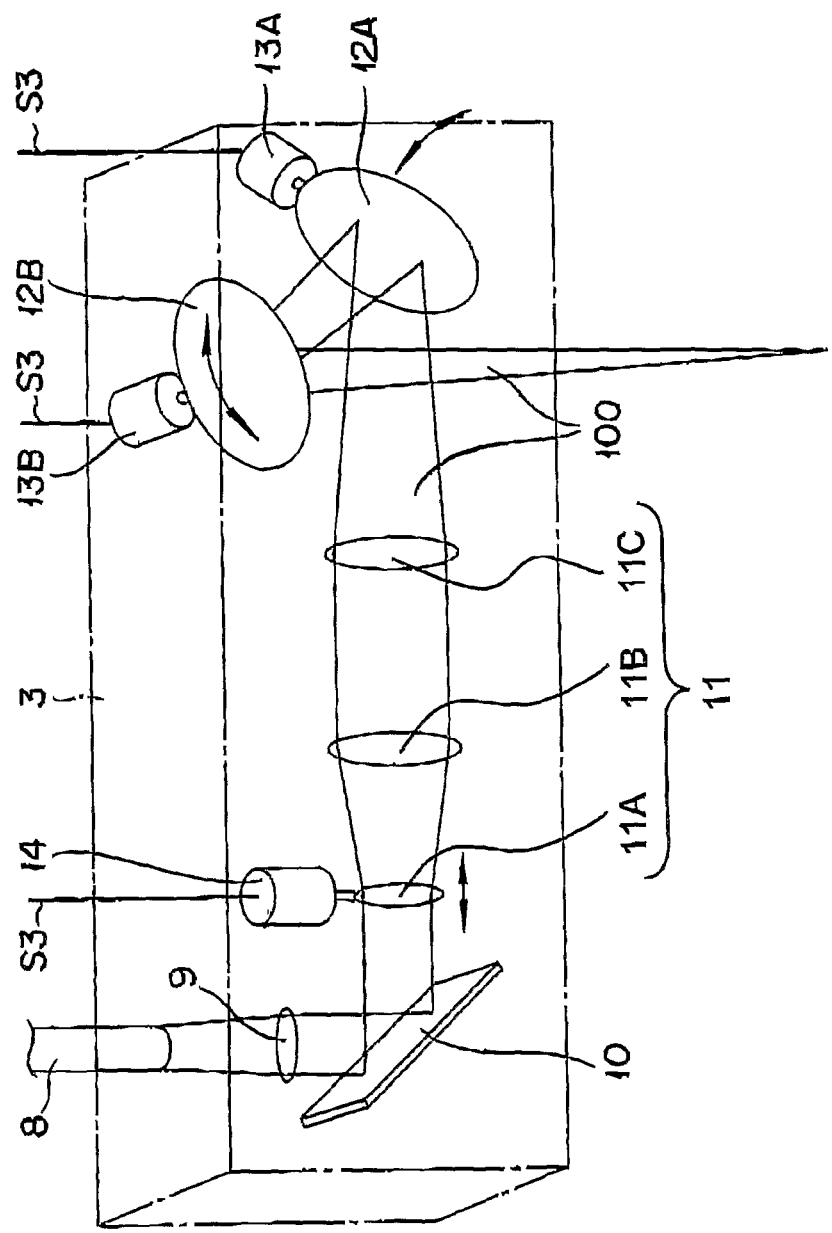
FIG. 2 is a schematic perspective view of a laser processing head of the laser welding system illustrating components disposed in the laser processing head in accordance with the first embodiment of the present invention.

Referring initially to FIGS. 1 to 7, a laser welding system 1 in which a laser welding method is used is illustrated in accordance with a first embodiment of the present invention. FIG. 1 is a simplified schematic diagram of the laser welding system 1 in accordance with the first embodiment of the present invention. FIG. 2 is a schematic perspective view of a laser processing head 3 of the laser welding system 1 illustrating components disposed in the laser processing head 3 in accordance with the first embodiment of the present invention.

Unlike conventional spot welding and other types of welding in which a welding jig is in direct contact with a workpiece, welding conducted using the laser welding system 1 in accordance with the first embodiment is accomplished with a laser beam emitted from the processing head 3 that is remote from a workpiece W.

The laser welding system 1 shown in FIG. 1 includes a laser oscillator 2 that serves as a laser light source, the processing head 3 configured and arranged to emit a laser beam 100 toward the workpiece W, a moving device 4 configured and arranged to support the processing head 3 to move the processing head 3 in multiple axial directions, and a control unit 5 configured to control the output of the laser oscillator 2, the movement of the moving device 4, and the operation of the processing head 3.

As seen in FIG. 1, the moving device 4 has a plurality of actuators 6 (two actuators 6 are provided in this example) and a plurality of moving axes 7 (two moving axes 7 are provided in this example) such that the moving device 4 can move the processing head 3 in multiple axial directions. Although the laser welding system 1 depicted in FIG. 1 is configured such that the processing head 3 can be moved in two axial directions, the system can also be configured to move the processing head 3 in three axial directions. The moving device 4 is configured to move the processing head 3 in accordance with movement path data obtained by performing a teaching operation. Although the moving device 4 of the first embodiment is illustrated as a multiple-axis moving device, it is also acceptable to use, for example, a device having an arm configuration (see FIG. 8).

As shown in FIG. 2, the laser beam 100 is carried to the processing head 3 by an optical fiber cable 8. The processing head 3 has a lens 9 through which the laser beam 100 passes, a mirror 10 configured and arranged to reflect the laser beam 100 exiting the lens 9, a lens set 11 having a plurality of lenses 11A to 11C, and two rotating mirrors 12A and 12B. The lens set 11 serves as a focal point controlling section that is configured and arranged to change the focal distance of the laser beam 100 reflected from the mirror 10. The rotating mirrors 12A and 12B are configured and arranged such that the rotating mirrors 12A and 12B can be turned to aim the laser beam 100 exiting the lens set 11 in the direction of a target. More specifically, the rotating mirrors 12A and 12B are arranged with respect to each other such that they can turn freely and independently about different axes and thereby freely change the emission direction of the laser beam 100. Consequently, two motors 13A and 13B are provided inside the processing head 3 for turning the rotating mirrors 12A and 12B, respectively. The movement of the motors 13A and 13B is controlled by a signal from the control unit 5. Similarly, a motor 14 is provided to change the focal point position determined by the lens set 11. In this embodiment, the motor 14 is configured and arranged to move, for example, the moveable lens 11A of the lens set 11 in accordance with control commands from the control unit 5.

The laser oscillator 2 is preferably a YAG laser oscillator. A YAG laser is used so that the laser beam 100 can be carried by the optical fiber cable 8. It is also possible to use a carbon dioxide gas laser as the laser oscillator 2 for remote laser welding, but the laser beam from a carbon dioxide gas laser cannot be carried by the optical fiber cable 8. Instead, a carbon dioxide gas laser beam is directed from the laser oscillator 2 to the processing head 3 using a reflecting mirror or a prism. Any other laser that can be used for laser welding can be used in the present invention. The method of conveying the laser beam to the processing head 3, e.g., using the optical fiber cable 8 or a reflecting mirror, is selected as appropriate depending on the type of laser used as the laser oscillator 2.

The control unit 5 will now be described in more detail. As seen in FIG. 1, the control unit 5 has a moving device control section 5A and a processing head control section 5B. The movement of the moving device 4 (i.e., operations of the actuators 6) is controlled by a movement amount command signal S1 from the moving device control section 5A. Thus, the moving device control unit 5A is configured to control the irradiation position where the laser beam strikes the workpiece W by controlling the movement of the moving device 4. The irradiation position where the laser beam strikes the workpiece W is also controlled using the rotating mirrors 12A and 12B in addition to the moving device 4.

The processing head control section 5B is configured to compute a processing head command signal S3 based on a signal S2 received from the moving device control unit 5A and to control the movement of the moveable lens 11A (i.e., to control the operation of the motor 14) and the movements of the rotating mirrors 12A and 12B (i.e., to control the operations of the motors 13A and 13B) by sending the processing head command signal S3 to the processing head 3. Thus, the movements of the moveable lens 11A and the rotating mirrors 12A and 12B can be controlled to be synchronized with the movement of the moving device 4 (i.e., the operations of the actuators 6).

The control unit 5 preferably includes a microcomputer with a laser welding control program that controls the laser oscillator 2, the processing head 3 and the moving device 4 as discussed below. The control unit 5 can also include other conventional components such as an input interface circuit, an output interface circuit, and storage devices such as a ROM (Read Only Memory) device and a RAM (Random Access Memory) device. The memory circuit stores processing results and control programs that are run by the processor circuit. The control unit 5 is operatively coupled to the laser oscillator 2, the processing head 3 and the moving device 4 in a conventional manner. The internal RAM of the control unit 5 stores statuses of operational flags and various control data. The internal ROM of the control unit 5 stores the control data for various operations. The control unit 5 is capable of selectively controlling any of the components of the control system in accordance with the control program. It will be apparent to those skilled in the art from this disclosure that the precise structure and algorithms for the control unit 5 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

As seen in FIG. 1, the laser oscillator 2 includes a laser oscillator control section 2A and a laser generating section 2B. The laser oscillator control section 2A is configured to receive a laser on/off command signal S4 from the moving device control section 5A of the control unit 5 and to send a laser generation command signal S5 to the laser generating section 2B. The laser generating section 2B is configured to output a laser beam in response to the laser generation command signal S5. Since the laser output of the laser generating section 2B responds relatively slowly to the laser generation command signal S5, the laser generating section 2B is normally operated such that a prescribed low-power laser beam is constantly outputted and the power is increased to the level required for welding when the laser generation command signal S5 is received.

The laser welding method performed with the laser welding system 1 in accordance with the first embodiment of the present invention will now be explained.

Figure 3:
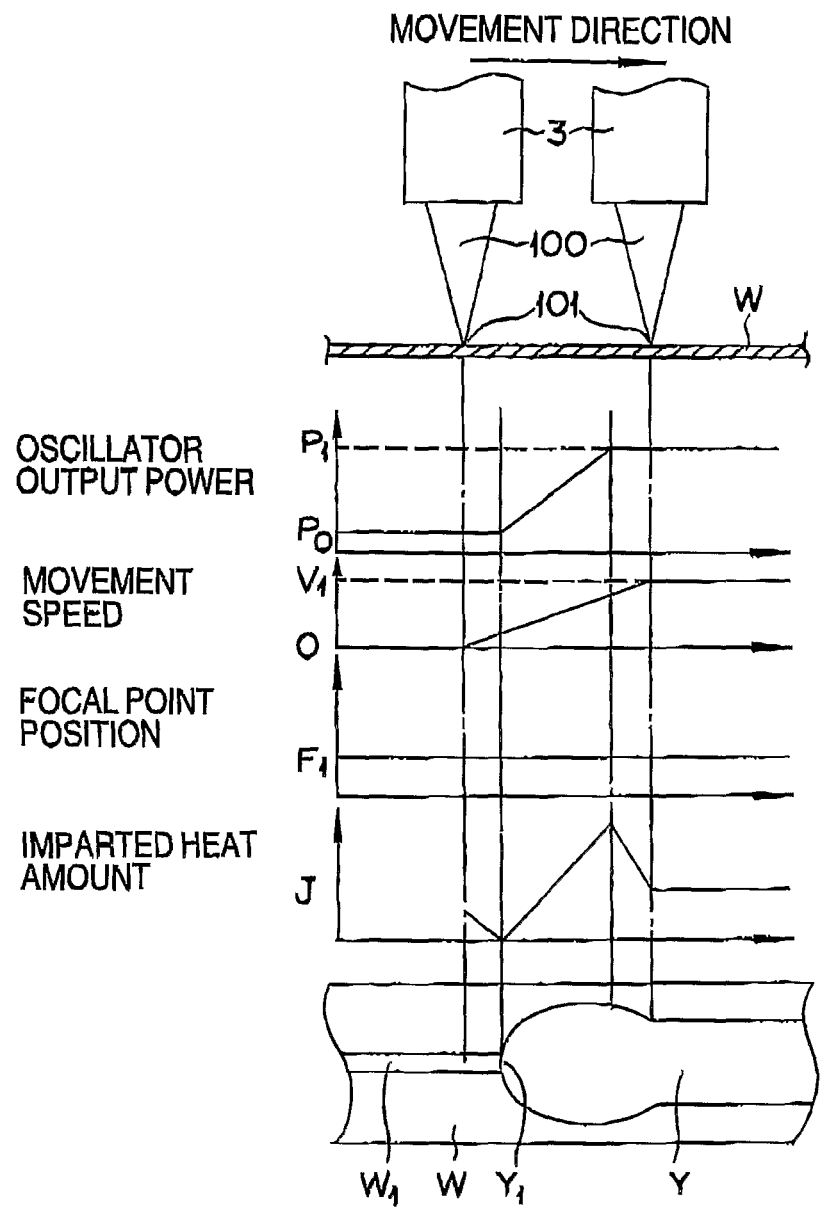
FIG. 3 is a set of graphs of the laser oscillator output power, the movement speed of the laser irradiation position, the focal point position of the laser beam, and the amount of heat imparted to the workpiece with respect to time at the start point of a weld in a case in which a comparison example of a laser welding method is used.
Figure 4:
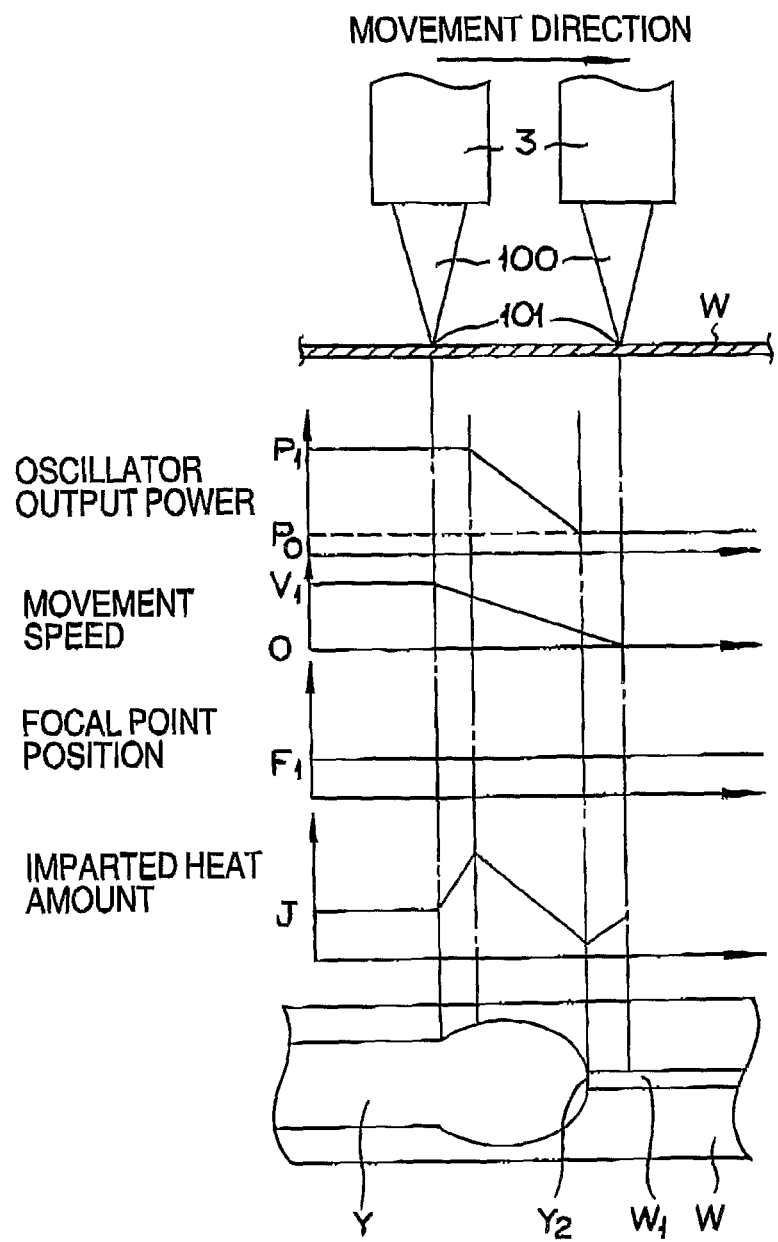
FIG. 4 is a set of graphs of the laser oscillator output power, the movement speed of the laser irradiation position, the focal point position of the laser beam, and the amount of heat imparted to the workpiece with respect to time at the end point of the weld in a case in which the comparison example of the laser welding method is used.

First, a comparison example of a laser welding method will be discussed in order to better explain the present invention. FIG. 3 is a set of graphs of the laser oscillator output power, the movement speed of the laser irradiation position, the focal point position of the laser beam, and the amount of heat imparted to the workpiece W with respect to time at the start point of a weld in a case in which a comparison example of a laser welding method is used. FIG. 4 is a set of graphs of the laser oscillator output power, the movement speed of the laser irradiation position, the focal point position of the laser beam, and the amount of heat imparted to the workpiece W with respect to time at the end point of the weld in a case in which the comparison example of the laser welding method is used. The processing head 3 is depicted in a simplified form in the top of FIGS. 3 and 4 to facilitate ease of explanation and to explain the changes in the laser oscillator output power, the movement speed, the focal point position, and the imparted power amount with respect to the position of the processing head 3 and the focal distance of the laser beam 100 emitted from the processing head 3 on to the workpiece W. More specifically, in FIGS. 3 and 4, the changes in the laser oscillator output power, the movement speed, the focal point position, and the imparted power amount are plotted in such a manner as to indicate the corresponding position along the weld portion on the workpiece W illustrated in a top plan view of the workpiece W at the bottom of FIGS. 3 and 4.

As shown in FIG. 3, with the comparison laser welding method, a focal point position 101 of the laser beam 100 is constantly aligned with the welding surface of the workpiece W and the output power of the laser oscillator 2 is raised from the low power level $P_0$ to the level $P_1$ when the laser irradiation position of the laser beam 100 reaches a welding start point $Y_1$ of a weld portion Y. When the laser output power level is increased, it takes time for the output power of the laser oscillator 2 to stabilize due to inherent delay in the control system and the poor control response characteristic of the output of the laser oscillator 2. Consequently, in the comparison example shown in FIG. 3, the movement of the irradiation position where the laser beam 100 strikes the surface of the workpiece W is temporarily stopped before the laser beam 100 reaches the welding start point $Y_1$ (see the movement speed graph in FIG. 3). Then, the movement speed is increased while increasing the output power of the laser oscillator 2. Since the movement speed is in the process of increasing (i.e., has not reached the speed $V_1$ used for welding), more heat than is necessary is imparted to the weld portion Y in the area or the welding start point $Y_1$ and the imparted heat amount J does not vary smoothly (see the imparted heat amount graph in FIG. 3). Consequently, the welding state becomes unstable and such problems as holes developing in the bead end and the bead width becoming too large sometimes occur in the comparison example shown in FIG. 3.

More time is usually required to switch the laser oscillator 2 from an off state to an on state than is required to increase the output power of the laser output when the laser oscillator 2 is already on. More specifically, when the laser oscillator 2 is switched from an off state to an on state, it takes time for required amount of electric energy to be supplied to the laser oscillator 2, the electric energy to be converted into light energy, and the amount of light energy to be amplified. Therefore, before welding is started, the laser beam is outputted at the low power level $P_0$ at which the workpiece will substantially not be welded. However, since the focal point position 101 of the laser beam 100 is aligned with the surface of the workpiece W, a laser output scar W1 is left on the surface of the workpiece W in the comparison example as shown in FIG. 3.

As shown in FIG. 4, with the comparison laser welding method, when the laser beam 100 reaches a welding end point $Y_2$ of the weld portion Y, the output level of the laser oscillator 2 is lowered from the power level $P_1$ to the low power level $P_0$. When the output laser power level is decreased, it takes time for the output power of the laser oscillator 2 to stabilize due to inherent delay in the control system and the poor control response characteristic of the output of the laser oscillator 2. Consequently, in the comparison example shown in FIG. 4, the movement speed of the irradiation position where the laser beam 100 strikes the surface of the workpiece W is decreased and the output power of the laser oscillator 2 is decreased while the laser beam 100 is moved to the welding end point Y2. At this stage, the movement speed is in the process of decreasing and, if it is decreased too much, more heat than is necessary will be imparted to the weld portion Y in the area of the welding end point $Y_2$ and the imparted heat amount J will not vary smoothly (see the imparted heat amount graph in FIG. 4). Consequently, similar problems to those described regarding the welding start point $Y_1$ illustrated in FIG. 3 will sometimes occur in the comparison laser welding method.

With the comparison laser welding method illustrated in FIGS. 3 and 4, when the movement speed of the laser irradiation position is changing, the weld quality is controlled by controlling the output power of the laser beam 100 in synchronization with the movement of the laser irradiation position. Consequently, the output power of the laser beam 100 must be controlled in accordance with the path and movement speed of the laser irradiation position and the quality becomes unstable at the welding start point $Y_1$ and the welding end point $Y_2$ in the comparison laser welding method.

Additionally, since the output power of the laser oscillator 2 is controlled with a signal from the control unit 5, the inherent time delay of the signal and variations in the amount of time between output of the signal and reception of the signal cause the laser output timing to vary. Therefore, it is necessary to allow time for the laser output to stabilize and to include a sacrificial marginal bead when the comparison laser welding method is used.

Furthermore, if laser welding is conducted without temporarily stopping the movement of the irradiation position in the comparison laser welding method, delay and variation of the laser output will make it impossible to form a weld of a prescribed shape in a prescribed position.

Figure 5:
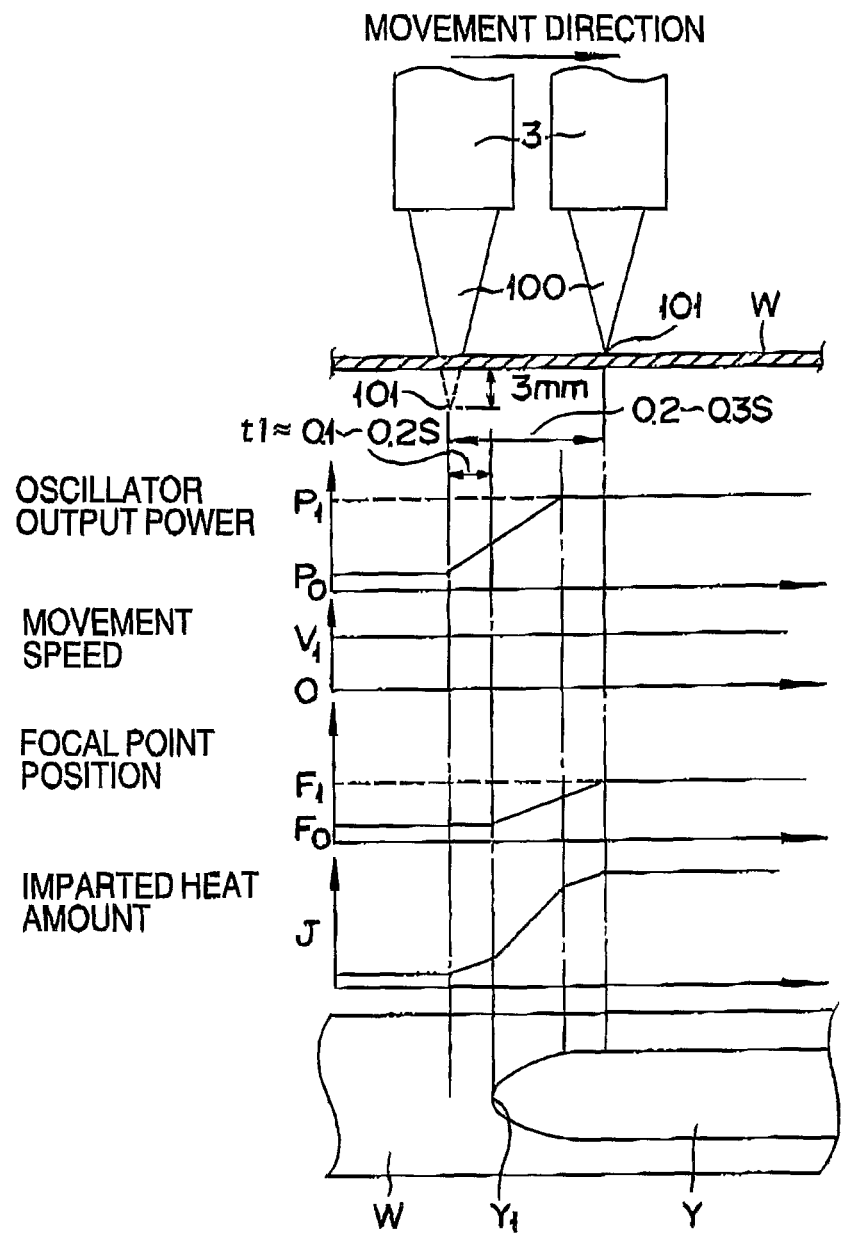
FIG. 5 is a set of graphs of the laser oscillator output power, the movement speed of the laser irradiation position, the focal point position of the laser beam, and the amount of heat imparted to the workpiece with respect to time at the start point of a weld in a case in which the laser welding method in accordance with the first embodiment of the present invention is used.
Figure 6:
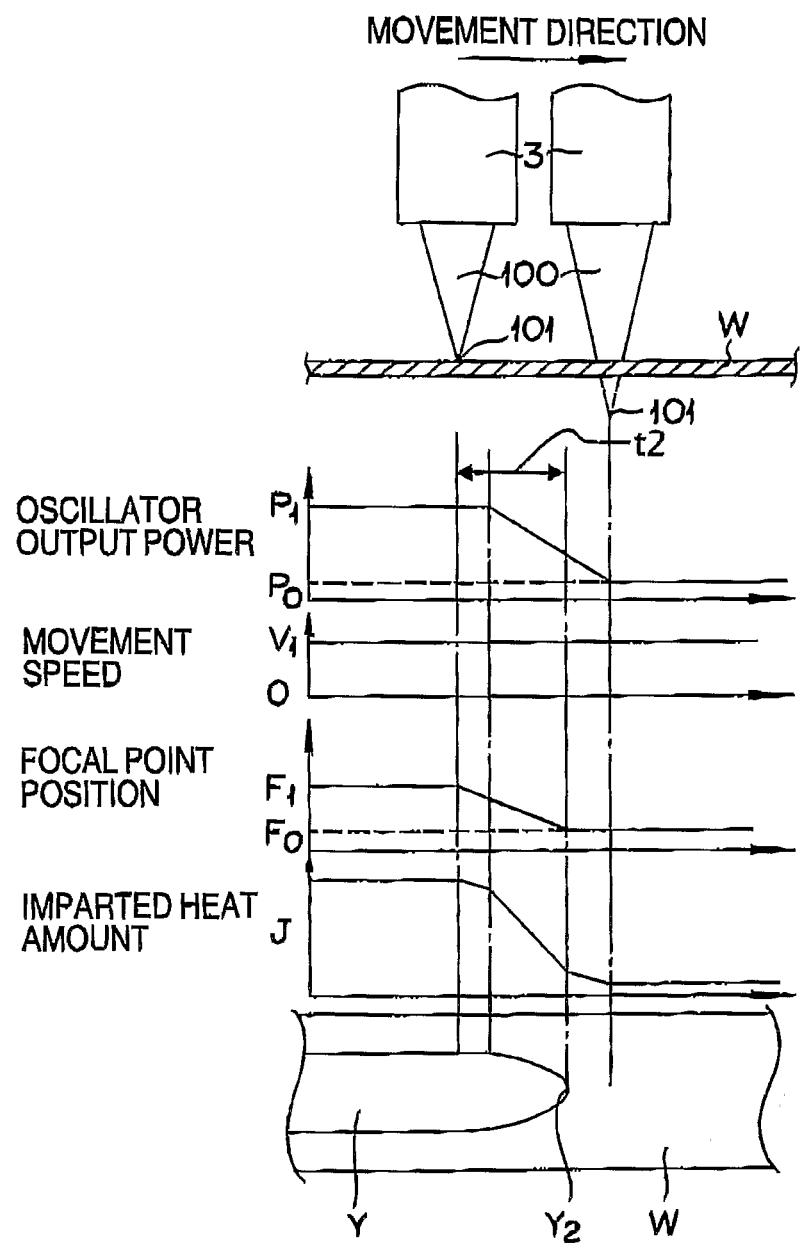
FIG. 6 is a set of graphs of the laser oscillator output power, the movement speed of the laser irradiation position, the focal point position of the laser beam, and the amount of heat imparted to the workpiece with respect to time at the end point of the weld in a case in which the laser welding method in accordance with the first embodiment of the present invention is used.

Referring now to FIGS. 5 and 6, the laser welding method in accordance with the first embodiment will be described. FIG. 5 is a set of graphs of the laser oscillator output power, the movement speed of the laser irradiation position, the focal point position of the laser beam, and the amount of heat imparted to the workpiece with respect to time at the start point of a weld in a case in which a laser welding method in accordance with the first embodiment of the present invention is used. FIG. 6 is a set of graphs of the laser oscillator output power, the movement speed of the laser irradiation position, the focal point position of the laser beam, and the amount of heat imparted to the workpiece W with respect to time at the end point of the weld in a case in which the laser welding method in accordance with the first embodiment of the present invention is used. The processing head 3 is depicted in a simplified form in the top of FIGS. 5 and 6 to facilitate ease of explanation and to explain the changes in the laser oscillator output power, the movement speed, the focal point position, and the imparted power amount with respect to the position of the processing head 3 and the focal distance of the laser beam 100 emitted from the processing head 3 on to the workpiece W. More specifically, in FIGS. 5 and 6, the changes in the laser oscillator output power, the movement speed, the focal point position, and the imparted power amount are plotted in such a manner as to indicate the corresponding position along the weld portion on the workpiece W illustrated in a top plan view of the workpiece W at the bottom of FIGS. 5 and 6.

The laser welding method of the first embodiment is arranged to move the processing head 3 with the moving device 4 and successively weld a plurality of weld portions Y provided on the workpiece W. In FIGS. 5 and 6, however, the process of welding only one of the welding portions Y will be explained.

With the laser welding method in accordance with the first embodiment, the focal point position 101 of the laser beam 100 is positioned, for example, approximately 3 mm away from the surface of the workpiece W (e.g., shifted below the surface of the workpiece W) before the laser irradiation position reaches the welding start point $Y_1$, as shown in FIG. 5. The control unit 5 is configured to begin increasing the output power of the laser oscillator 2 at a prescribed amount of time t1 (for example 0.1 to 0.2 second) before the laser irradiation position reaches the welding start point $Y_1$. The prescribed amount of time t1 is preferably set such that the laser output power reaches a required level and stabilizes by the time the laser irradiation position reaches the welding start point $Y_1$. Then, immediately before the laser irradiation position reaches the welding start point $Y_1$, the control unit 5 is configured to start aligning (i.e., start shifting to an aligned position) the focal point position 101 of the laser beam 100 with the surface of the workpiece W by controlling the lens set 11 (in this embodiment, by controlling the movement of the lens 11A). Since, unlike the laser output power, the focal point position 101 can be moved with good control response characteristic by controlling the lens set 11, welding can be started precisely at the correct position (i.e., the welding start position $Y_1$) without temporarily reducing the movement speed and positioning the processing head 3 with respect to the welding start position $Y_1$. In other words, as seen in FIG. 5, the movement speed of the laser irradiation position is preferably maintained at a constant speed $V_1$.

Also, the output power of the laser oscillator 2 is not an issue so long as it reaches the required level for welding by the time the laser irradiation position reaches the welding start point $Y_1$. Thus, the position of the welding start point $Y_1$ depends on the movement of the focal point position 101, which has good control response characteristic. As a result, the welding start point $Y_1$ can be positioned with a high degree of precision and the bead of the weld part Y can be formed appropriately as shown in FIG. 5. The time required for the focal point position 101 to be moved to the surface of the workpiece once the output power of the laser oscillator 2 starts rising is, for example, approximately 0.2 to approximately 0.3 second.

Since the focal point position 101 is gradually aligned with the surface of the workpiece W at the welding start point $Y_1$ of the weld part Y while the output power of the laser oscillator 2 rises, the imparted heat amount J imparted to the surface of the workpiece W does not rise suddenly and a stable welding state can be achieved. As a result, a smooth bead can be obtained without executing unnecessary additional welding.

Even though the laser oscillator 2 is emitting a laser beam at the low power level $P_0$ before the welding is commenced, a laser output scar is not formed because the focal point position 101 is not aligned with the surface of the workpiece W. As a result, a nice appearance can be achieved after welding.

As shown in FIG. 6, the laser beam can be controlled similarly at the welding end point $Y_2$ of the weld part Y to end the laser welding without temporarily reducing the movement speed of the laser irradiation position. In order to finish shifting the focal point position 101 away from the surface of the workpiece W when the irradiation position reaches the welding end point $Y_2$, the control unit 5 is configured to begin moving the focal point position 101 at a prescribed amount of time t2 before the welding end point $Y_2$ is reached. Then, the control unit 5 is configured to start lowering the output power of the laser oscillator 2 and the laser welding is finished when shifting of the focal point position 101 is completed at the welding end point $Y_2$ of the weld portion Y. After the laser welding is finished, the control unit 5 is configured to move the laser beam 100 to the next weld portion (i.e., position on the workpiece W where a weld is to be made).

Figure 7:
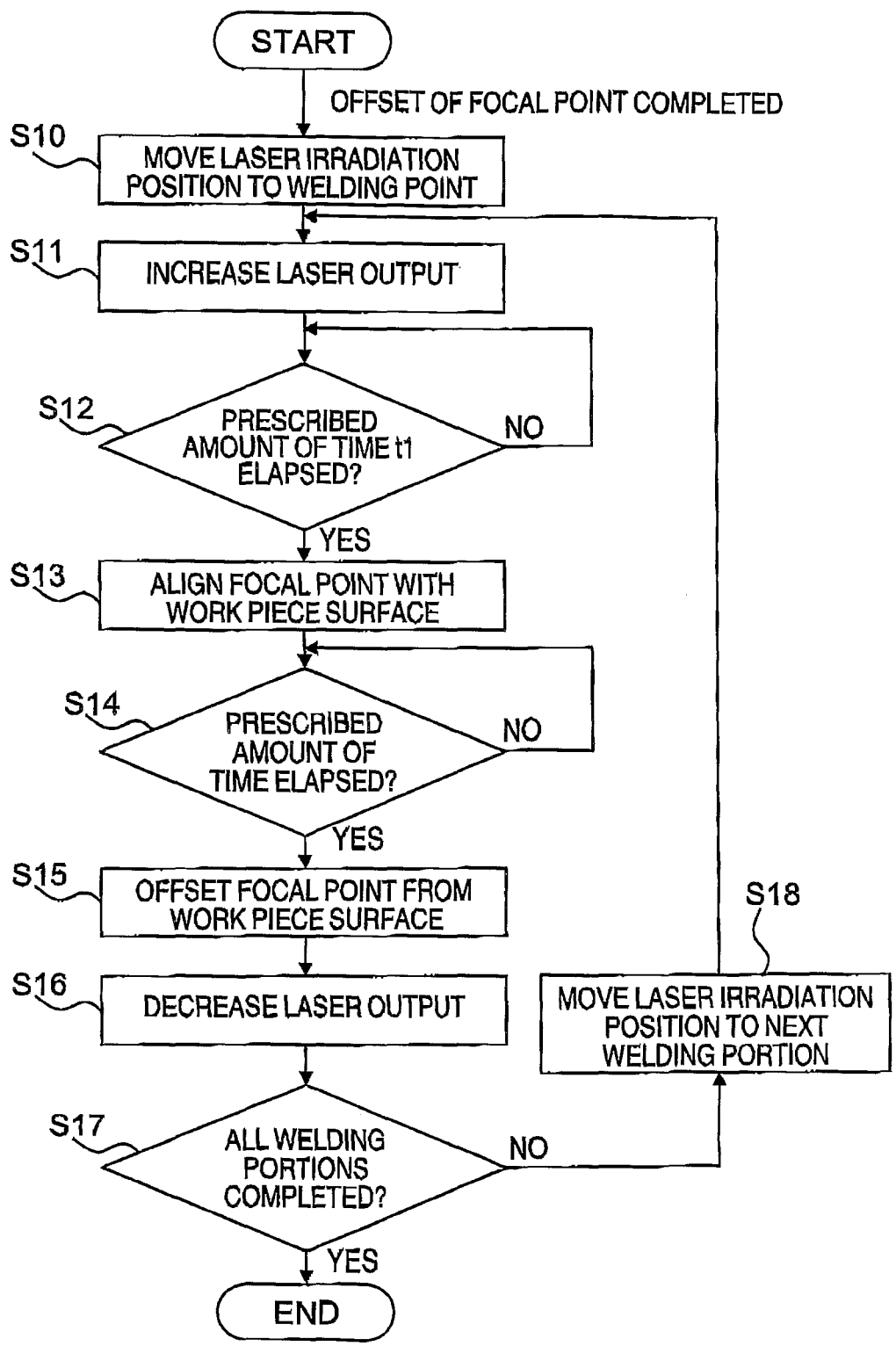
FIG. 7 is a flowchart of the control processing of the laser welding method executed by a control unit of the laser welding system in accordance with the first embodiment of the present invention.

The control process executed in the control unit 5 of the laser welding system 1 will be described with reference to the flowchart of FIG. 7. When the control processing of the FIG. 7 starts, the focal point position 101 of the laser beam 100 is set to be offset (set in an offset position) from the surface of the workpiece W as shown in FIG. 5. In step S10, the control unit 5 is configured to move the laser irradiation position toward the weld portion Y. When the laser irradiation position reaches at the prescribe amount of time t1 before the welding start point Y1, in step S11, the control unit 5 is configured to start increasing the laser output power of the laser oscillator 2 from the low power level P0 toward the power level P1 required for welding. In step S12, the control unit 5 is configured to determine whether the prescribe amount of time t1 has elapsed. If the control unit 5 determines that the prescribe amount of time t1 has elapsed in step S12, the control unit 5 is configured to start aligning the focal point position 101 of the laser beam 100 with the surface of the workpiece W to commence welding in step S13. In step S14, the control unit 5 is configured to determine whether a prescribed amount of time has elapsed. The prescribed amount of time used in step S14 is determined based on the size of the weld portion Y and other factors. When the laser irradiation position reaches at the prescribed amount of time t2 before the welding end point Y2, in step S15, the control unit 5 is configured to start moving the focal point position 101 so as to be offset from the surface of the workpiece W. Then, in step S16, the control unit 5 is configured to start decreasing the laser output power of the laser oscillator 2. In step S17, the control unit 5 is configured to determine whether laser welding of all the weld portions are completed. If it is determined in step S17 that all the weld portions are not welded yet, the control unit 5 is configured to move the laser irradiation point to the next weld portion in step S18 and to repeat the processing in steps S11 to S17. When it is determined that laser welding of all the weld portions are completed in step S17, the control unit 5 is configured to end the control processing described in FIG. 7.

With the laser welding method of the first embodiment, the welding start point $Y_1$ and the welding end point $Y_2$ of the weld portion Y can be processed by moving the focal point position 101 of the laser beam 100, thereby eliminating the need to execute operations specifically contrived to compensate for the poor control response characteristic of the laser oscillator 2. Additionally, the focal point position 101 can be controlled by the lens set 11 (focal point controlling section) with good control response characteristic. Since the welding tart point $Y_1$ and the welding end point $Y_2$ of the weld portion Y can be processed with good control response characteristic by moving the focal point position 101, the edges of the weld Y can be processed with high quality. Furthermore, the speed of the welding process can be increased (i.e., the welding time can be reduced) because the time required for precisely synchronizing the movement of the processing head 3 with the laser oscillator 2 can be omitted.

Since the focal point position 101 is gradually shifted away from the surface of the workpiece at the welding end point $Y_2$ of the weld part Y while the output power of the laser oscillator 2 decreases, the imparted heat amount J imparted to the surface of the workpiece W does not change suddenly and a stable welding state can be achieved. As a result, a smooth bead can be obtained without executing unnecessary additional welding.

Additionally, since the weld end processing is not dependent on the output power of the laser oscillator 2, the occurrence of holes and other quality instabilities at the ends of the weld can be prevented even in situations where the system is stopped suddenly during laser welding, such as in an emergency stop situation.

With the laser welding method of the first embodiment, the change in the imparted heat amount J is dependent on the focal point position 101 of the laser beam 100. The imparted heat amount J is proportional to the surface area of the laser irradiated portion of the workpiece W, and thus, is proportion to the square of the radius of the irradiated portion. Consequently, the imparted heat amount J is very sensitive to changes in the focal point position 101 and can be controlled at a higher speed.

Since the laser welding method of the first embodiment does not require complex control of the movement speed of the laser irradiation position, good welding quality can be maintained without executing complex control of the rotating mirrors 12A and 12B.

In the example shown in FIGS. 5 and 6, the point where the focal point position 101 starts shifting (rising) to align with the surface of the workpiece W and the point where the focal point position 101 finishes shifting (falling) to be offset from the surface of the workpiece W match (synchronize) the welding start point $Y_1$ and the welding end point $Y_2$, respectively. However, the welding start point $Y_1$ and the welding end point $Y_2$ are determined based on the imparted heat amount J and do not necessarily have to coincide with the point where the focal point position 101 starts rising and the point where the focal point position 101 finishes falling.

Second Embodiment

Figure 8:
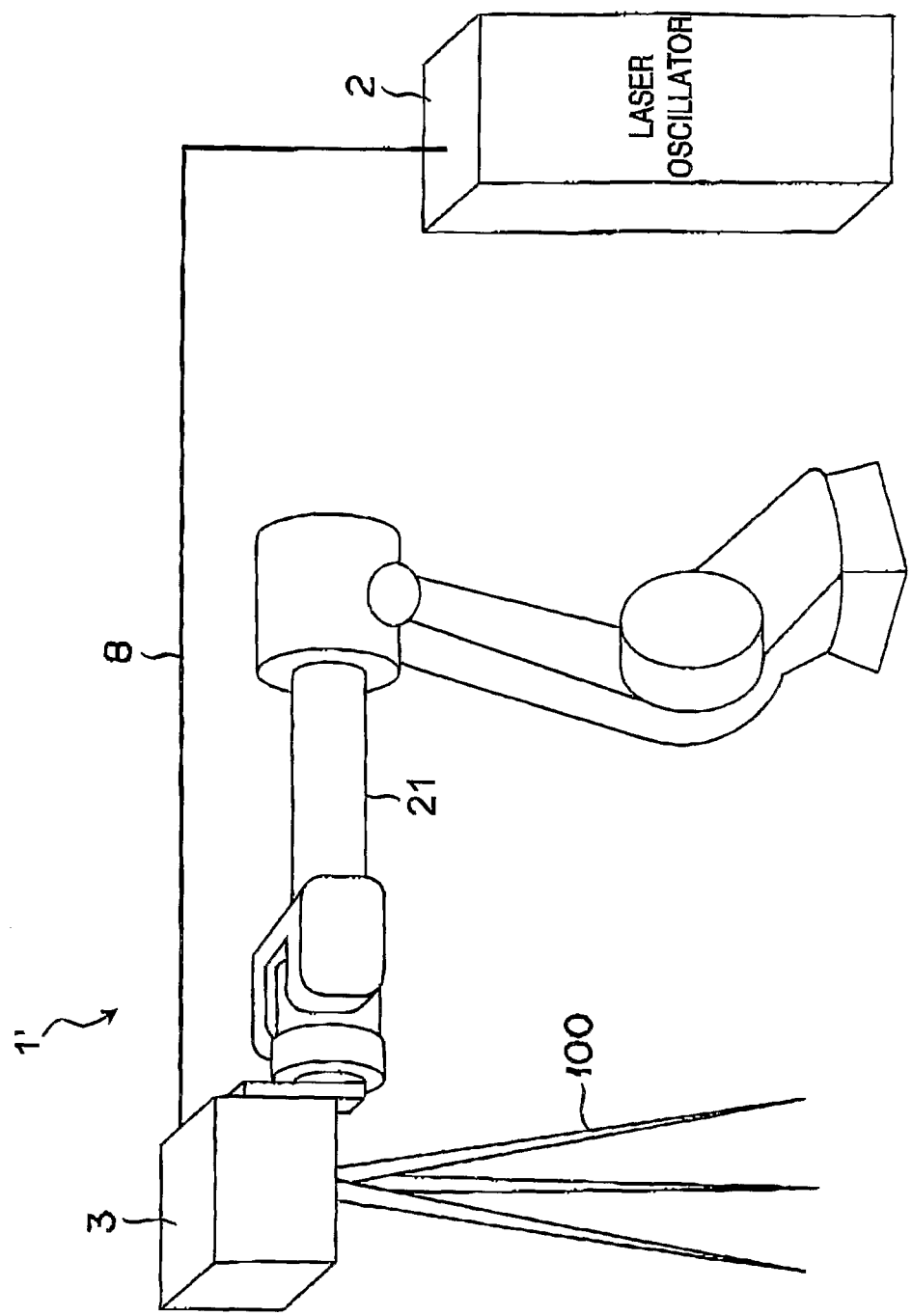
FIG. 8 is a perspective schematic view of a laser welding system in which a laser welding method is used in accordance with a second embodiment of the present invention.
Figure 9:
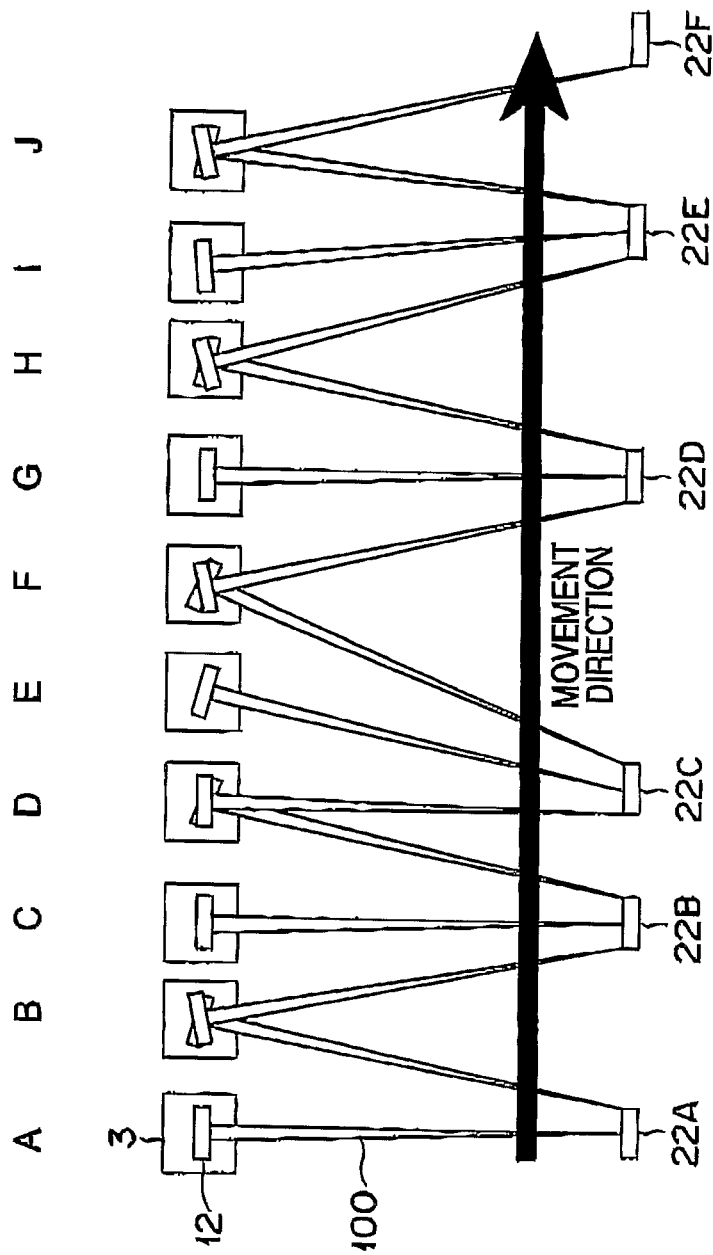
FIG. 9 is a schematic view of a laser processing head of the laser welding system with respect to a plurality of welding portions illustrating how the laser beam emission direction is changed in the laser welding system in accordance with the second embodiment.

Referring now to FIGS. 8 and 9, a laser welding system 1' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIG. 8 is a perspective schematic view of the laser welding system 1' in which a laser welding method is used in accordance with the second embodiment, and FIG. 9 is a schematic diagram illustrating how the emission direction of the laser beam 100 is varied when the laser welding method in accordance with the second embodiment is employed. A simple basic example is used in FIG. 9 to facilitate ease of understanding.

The laser welding system 1' of the second embodiment differs from the laser welding system 1 of the first embodiment in that the laser welding system 1' of the second embodiment includes an arm structure 21 with a plurality of moving axes constituting a multiple-axis moving device as seen in FIG. 8 instead of the moving device 4 of the first embodiment. The processing head 3 is coupled to a tip end of the arm structure 21 as shown in FIG. 8. Otherwise, the constituent features and the laser welding method are the same as in the first embodiment and explanations thereof are omitted.

The rotating mirrors 12A and 12B (collectively referred as 12 in FIG. 9) are provided inside the processing head 3 similarly to the first embodiment. The rotating mirrors 12A and 12B are configured and arranged to be turned in accordance with the movement of the arm structure 21 so as to change the emission direction of the laser beam 100. In the second embodiment, it is also acceptable to include only one rotating mirror in the processing head 3 instead of two rotating mirrors because the arm structure 21 with a plurality of axes is capable of changing the position and angle of the processing head 3 to make it possible to redirect the laser beam 100 toward a target position by the single rotating mirror.

In the second embodiment, when there are multiple welding portions 22A to 22F as shown in FIG. 9, even while the laser beam 100 is being emitted toward the currently targeted welding portion (e.g., portion 22A), the processing head 3 is moved at a prescribed speed toward the next welding portion (e.g., portion 22B). Even though the processing head 3 is moving, the rotating mirrors 12A and 12B are controlled such that the laser beam 100 does not move away from the welding point currently being welded (e.g., portion 22A) until the weld at that welding point (e.g., portion 22A) is completed.

The position movement of the processing head 3 is accomplished by moving the arm structure 21. The movement of the arm structure 21 is controlled by the movement device control section 5A of the control unit 5 as in the first embodiment and is moved such that the position of the processing head 3 is moved at a constant speed from the current welding point toward the next welding point. Thus, in the example shown in FIG. 9, the processing head 3 is moved at a constant speed from the position A to the position J.

While one welding point is being welded, the rotating mirrors 12A and 12B are turned such that the laser irradiation position of the laser beam 100 moves in the opposite direction relative to the movement of the processing head 3 at a prescribed welding movement speed that is almost equal to the movement speed of the processing head 3. Since the laser focal point position moves at almost the same speed as the processing head 3 but in the opposite direction, the laser focal point position remains substantially fixed at one welding portion while that welding portion is being welded. The reason the laser irradiation position is moved at "almost" the same speed as the processing head 3 is that, depending on the bead formation length (bead size) of the welding point, it may be necessary to move the laser irradiation position with respect to a single welding portion. In other words, based on the bead formation length, the movement speed of the laser irradiation position is adjusted to be slightly slower than the movement speed of the processing head 3 such that a bead is formed along the direction in which the processing head 3 is moving.

The movement speed of the processing head 3 needs to be faster than the welding speed so that the laser beam 100 can reach the next welding portion (e.g., portion 22B) immediately after the welding of the current welding portion (e.g., portion 22A) is completed.

Third Embodiment

Figure 10:
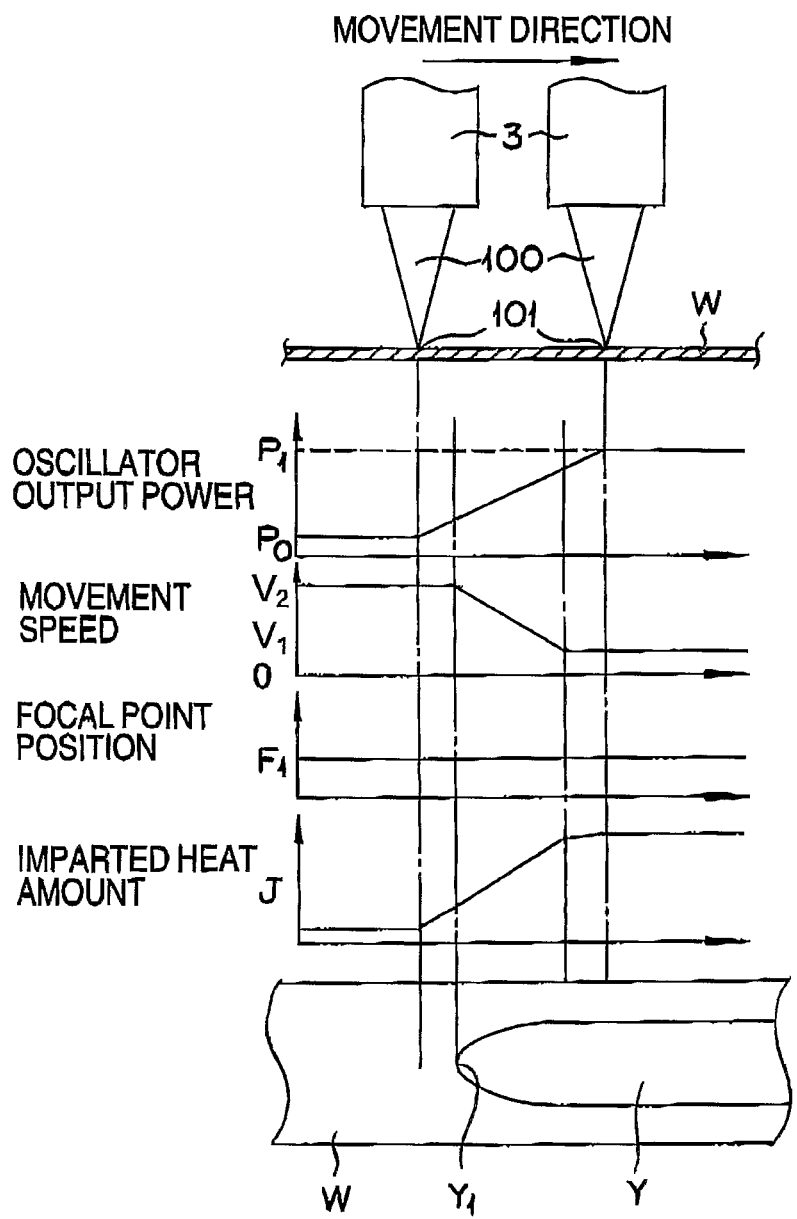
FIG. 10 is a set of graphs of the laser oscillator output power, the movement speed of the laser irradiation position, the focal point position of the laser beam, and the amount of heat imparted to the workpiece with respect to time at the start point of a weld in a case in which a laser welding method in accordance with a third embodiment is used.
Figure 11:
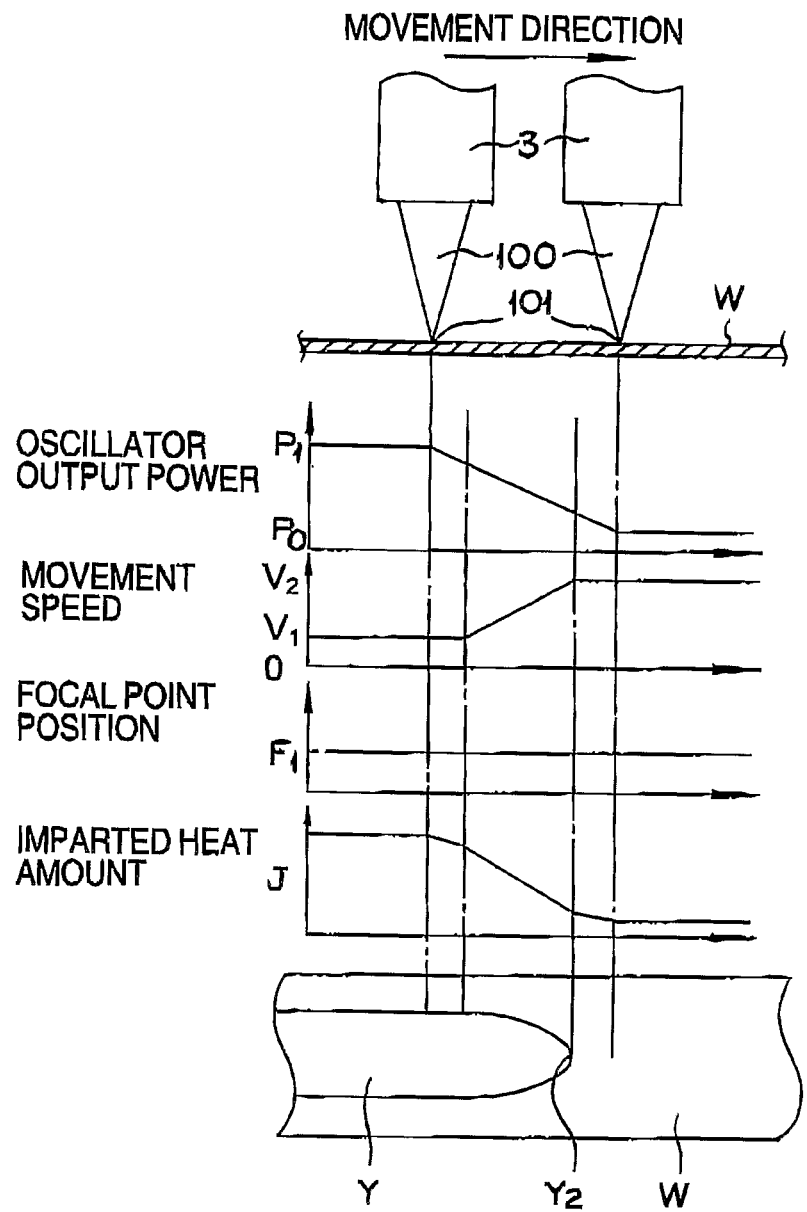
FIG. 11 is a set of graphs of the laser oscillator output power, the movement speed of the laser irradiation position, the focal point position of the laser beam, and the amount of heat imparted to the workpiece with respect to time at the end point of the weld in a case in which the laser welding method in accordance with the third embodiment is used.

Referring now to FIGS. 10 and 11, a laser welding system in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the constituent features of the laser welding system are the same as those of the laser welding system 1 of the first embodiment illustrated in FIGS. 1 and 2. The laser welding method of the third embodiment differs from the laser welding method of the first embodiment in that the movement speed of the laser irradiation position is controlled in the areas of the welding start point $Y_1$ and the welding end point $Y_2$ of the weld portion Y in the third embodiment instead of controlling the focal point position 101 of the laser beam 100 as in the first embodiment.

FIG. 10 is a set of graphs of the laser oscillator output power, the movement speed of the laser irradiation position, the focal point position of the laser beam, and the amount of heat imparted to the workpiece with respect to time at the start point of a weld in a case in which a laser welding method in accordance with the third embodiment is used. FIG. 11 is a set of graphs of the laser oscillator output power, the movement speed of the laser irradiation position, the focal point position of the laser beam, and the amount of heat imparted to the workpiece with respect to time at the end point of the weld in a case in which the laser welding method in accordance with the third embodiment is used.

Similarly to the first embodiment, the laser welding method in accordance with the third embodiment is configure to move the processing head 3 with the moving device 4 (FIG. 1) and successively weld a plurality of weld portions Y provided on a workpiece W. In FIGS. 10 and 11, the process of welding only one of the welding portions Y will be explained.

As shown in FIG. 10, the laser welding method of the third embodiment is configured and arranged such that the focal point position 101 of the laser beam 100 remains at the welding surface of the workpiece W from start to finish and is not shifted when the laser irradiation position is in the vicinity of the welding start point $Y_1$. Instead, before the laser irradiation position reaches the welding start point $Y_1$ (i.e., when the laser irradiation position is moving in a transitional area from one welding portion to another welding portion), the laser irradiation position is being moved at a prescribed speed $V_2$ (transitional movement speed) that is too fast for the laser beam 100 to impart the amount of heat J required to weld the workpiece surface. In the third embodiment, the rotating mirrors 12A and 12B and the moving device 4 constitute the laser irradiation position moving section of the present invention. The control unit 5 is configured to control the laser irradiation position moving section in order to change the movement speed of the laser irradiation position.

The control unit 5 is configured to begin increasing the output power of the laser oscillator 2 at, for example, 0.1 to 0.2 second before the laser irradiation position reaches the welding start point $Y_1$ such that, by the time the laser irradiation position reaches the welding start point $Y_1$, the laser output power reaches the required level and stabilizes. Then, immediately before the laser irradiation position reaches the welding start point $Y_1$, the movement speed of the laser irradiation position with respect to the surface of the workpiece W is reduced from the prescribed speed $V_2$ to a prescribed speed $V_1$ (welding movement speed) with which the amount of heat required for welding the workpiece is imparted to the workpiece W. In other words, the movement speed is reduced to the prescribed speed $V_1$ such that the imparted heat amount J imparted to the surface of the workpiece W by the laser beam 100 increases and welding begins. Unlike the laser output power (which has poor control response characteristic), movement of the laser irradiation position can changed with good control response characteristic by controlling the rotating mirrors 12A and 12B and the moving device 4. Consequently, welding can be started precisely at the correct position without temporarily reducing the movement speed and positioning the laser beam.

Also, the output power of the laser oscillator 2 is not an issue so long as it reaches the required level for welding by the time the laser irradiation position reaches the weld start point $Y_1$, and thus, the position of the weld start point $Y_1$ depends on the movement speed of the laser irradiation position, which has good control response characteristic. As a result, the welding start point $Y_1$ can be positioned with a high degree of precision and the bead of the weld portion Y can be formed appropriately.

Since, at the welding start point $Y_1$, the movement speed of the laser irradiation position is gradually decreased while the output power of the laser oscillator 2 rises, the imparted heat amount J imparted to the surface of the workpiece W does not rise suddenly and a stable welding state can be achieved as shown in FIG. 10. As a result, a smooth bead can be obtained without executing unnecessary additional welding.

Even though the laser oscillator 2 is emitting a laser beam at the low power level $P_0$ before the welding is commenced, a laser output scar is not formed because the laser irradiation position is moving at a high speed $V_2$ with respect to the surface of the workpiece W. As a result, a nice appearance can be achieved after welding.

As shown in FIG. 11, the welding can be controlled similarly at the welding end point $Y_2$ of the weld portion Y by changing the movement speed of the laser irradiation position.

Again, in the third embodiment, the focal point position 101 of the laser beam 100 remains at the surface of the workpiece W from start to finish and is not changed when the laser irradiation position is in the vicinity of the welding end point $Y_2$. Instead, before the laser irradiation position reaches the welding end point $Y_1$, the laser irradiation position is moving at the prescribed speed $V_1$ that is appropriate for the laser beam 100 to impart the amount of heat required to weld the workpiece surface. When the laser irradiation position is near the welding end point $Y_2$, the control unit 5 is configured to start increasing the movement speed of the laser irradiation position toward the speed $V_2$ that is too fast for the laser beam 100 to impart the amount of heat J required to weld the workpiece surface. Then, the control unit 5 is configured to start lowering the output power of the laser oscillator 2 and the weld is finished when the increase of the irradiation position movement speed is completed at the welding end point $Y_2$ of the weld portion Y. After the weld is finished, the control unit 5 is configured to continue lowering the laser output power to the low power level $P_0$ and to move the laser beam 100 to the next welding point while holding the laser output power at the low power level $P_0$.

In this way, the laser welding method of the third embodiment enables the welding start point $Y_1$ and the welding end point $Y_2$ of the weld portion Y to be processed by controlling the movement speed of the laser irradiation position, thereby eliminating the need to execute operations specifically contrived to compensate for the poor control response characteristic of the laser oscillator 2. Additionally, the laser irradiation position can be controlled by the laser irradiation position moving section (the rotating mirrors 12A and 12B and the moving device 4) with good control response characteristic. Since the welding start point $Y_1$ and the welding end point $Y_2$ of the weld portion Y can be processed with good control response characteristic by controlling the movement speed of the laser irradiation position, the edges of the weld portion Y can be processed with high quality. Furthermore, the speed of the welding work can be increased (i.e., the welding time can be reduced) because the time required for synchronizing with the laser oscillator 2 can be omitted.

Since, at the welding end point $Y_2$, the movement speed of the laser irradiation position is gradually increased while the output power of the laser oscillator 2 is decreased, the heat imparted to the surface of the workpiece W does not suddenly stop. Therefore, a stable welding state can be achieved. As a result, a smooth bead can be obtained without executing unnecessary additional welding.

Additionally, since the weld end processing is not dependent on the output power of the laser oscillator 2, the occurrence of holes and other quality instabilities at the ends of the weld can be prevented even in situations where the system is stopped suddenly during laser welding, such as in an emergency stop situation.

With the laser welding method of the third embodiment, since the focal point position 101 is held constant during welding, the welding can be accomplished with a simple optics system and the cost of the system can be reduced.

With the laser welding method of the third embodiment, the laser irradiation position and the movement speed thereof can be controlled easily because the laser irradiation position moving section (the rotating mirrors 12A and 12B and the moving device 4) is controlled directly by the control unit 5.

With the laser welding method of the third embodiment, the drive system for the laser irradiation position moving section (the rotating mirrors 12A and 12B and the moving device 4) can be configured to be lightweight and compact, and thus, the laser irradiation position can be moved at high speeds and with a high level of performance. As a result, the weld quality can be stabilized and the time required for increasing and decreasing the movement speed of the laser irradiation position can be shortened.

In the example shown in FIGS. 10 and 11, the point where the movement speed of the irradiation position starts increasing and the point where the movement speed of the irradiation position finishes decreasing match (synchronize) the welding start point $Y_1$ and the welding end point $Y_2$, respectively. However, the welding start point $Y_1$ and the welding end point $Y_2$ are determined based on the imparted heat amount J and do not necessarily have to coincide with the point where the movement speed of the irradiation position starts increasing and the point where the movement speed of the irradiation position finishes decreasing.

The present invention is not limited to the embodiments described heretofore. Various modifications and improvements can be made within the scope of the claims. For example, instead of moving the focal point position 101 by moving the movable lens 11A in the first embodiment, the focal point position 101 can be moved by moving the processing head 3 with the moving device 4 (or the arm structure 21), changing the emission angle of the mirror 12, or by using a combination of these. Also, a plurality of movable lenses can be used instead of one.

Additionally, the focal point controlling section of the present invention can be configured and arranged to change the spot diameter of the laser beam 100 at the irradiation position instead of moving the focal point position 101. In other words, instead of adjusting the imparted heat amount J by moving the focal point position 101, the imparted heat amount J can be adjusted by changing the surface area of the portion of the workpiece W that is irradiated by the laser beam, i.e., by changing the spot size of the laser beam.

It is also acceptable to combine the first embodiment and the third embodiment such that the welding start point $Y_1$ and the welding end point $Y_2$ of each weld portion Y are processed using both the focal point controlling section and the laser irradiation position moving section.

Accordingly, the laser welding method in accordance with the present invention is arranged to switch from one weld portion to another weld portion by controlling the focal point position 101 of the laser beam 100 and/or the movement speed of the irradiation position of the laser beam 100. In other words, the laser welding system in accordance with the present invention is provided with the focal point controlling section and the laser irradiation position moving section. Thus, the edges of the weld portions Y can be processed with high quality by controlling the focal point controlling section or the laser irradiation position moving section, both of which have good response characteristic to control commands.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A laser welding method comprising:
    controlling a focal point of a laser beam outputted from a laser oscillator to selectively focus the laser beam on a surface of a workpiece;
    moving a laser irradiation position at which the laser beam strikes on the surface of the workpiece; and
    selectively switching between a welding state and a non-welding state by changing a distance between the focal point and where the laser beam strikes the surface of the workpiece such that in the welding state the focal point is aligned with respect to the surface of the workpiece and such that in the non-welding state the focal point is positioned away from the surface of the workpiece while continuously outputting the laser beam from the laser oscillator before and after the switching between the welding state and the non-welding state,
    the selectively switching between the welding state and the non-welding state further including switching to the welding state by starting to increase a laser output power of the laser oscillator from a low power level toward a power level required for welding at a prescribed amount of time before the laser irradiation position reaches a welding start point, and starting to align the focal point with respect to the surface of the workpiece at the welding start point.

2. The laser welding method as recited in claim 1, wherein the controlling of the focal point includes controlling an optics system to redirect the laser beam outputted from the laser oscillator.

3. The laser welding method as recited in claim 2, wherein the controlling of the focal point includes controlling a position of a lens of the optics system to change the focal point of the laser beam.

4. The laser welding method as recited in claim 2, wherein the moving of the laser irradiation position includes controlling a movement of a mirror of the optics system to change a movement speed of the laser irradiation position.

5. The laser welding method as recited in claim 1, wherein the moving of the laser irradiation position includes reducing a movement speed of the laser irradiation position from a transitional movement speed to a welding movement speed required for the laser beam to impart an amount of heat to weld the surface of the workpiece to switch from the non-welding state to the welding state.

6. The laser welding method as recited in claim 1, further comprising
    synchronizing the controlling of the focal point with the laser irradiation position reaching a welding end point on the surface of the workpiece to switch from the welding state to the non-welding state.

7. The laser welding method as recited in claim 6, wherein the moving of the laser irradiation position includes increasing a movement speed of the laser irradiation position from a welding movement speed required for the laser beam to impart an amount of heat to weld the surface of the workpiece to a transitional movement speed to switch from the welding state to the non-welding state.

8. The laser welding method as recited in claim 6, further comprising
    starting to decrease the laser output power from the laser oscillator before the switching from the welding state to the non-welding state.

9. A laser welding system comprising:

a laser oscillator configured and arranged to output a laser beam to selectively weld a surface of a workpiece;

a focal point controlling section including a lens set configured and arranged to control a focal point of the laser beam outputted from the laser oscillator to selectively focus the laser beam on the-surface of the workpiece;

a laser irradiation position moving section configured and arranged to move a laser irradiation position at which the laser beam strikes on the surface of the workpiece; and a control unit configured to selectively switch between a welding state and a non-welding state by changing a distance between the focal point and where the laser beam strikes the surface of the workpiece such that in the welding state the focal point is aligned with respect to the surface of the workpiece and such that in the non-welding state the focal point is positioned away from the surface of the workpiece while controlling the laser oscillator to continuously output the laser beam before and after switching between the welding state and the non-welding state, the control unit being further configured to start increasing a laser output power of the laser oscillator from a low power level toward a power level required for welding at a prescribed amount of time before the laser irradiation position reaches a welding start point, and start aligning the focal point with respect to the surface of the workpiece at the welding start point to switch from the non-welding state to the welding state.

10. The laser welding system as recited in claim 9, wherein
the focal point controlling section is configured and arranged to control the lens set that is configured and arranged to redirect the laser beam outputted from the laser oscillator.

11. The laser welding system as recited in claim 10, wherein
the focal point controlling section is configured and arranged to control a position of a lens of the lens set to change the focal point of the laser beam.

12. The laser welding system as recited in claim 10, wherein
the laser irradiation position moving section is configured and arranged to control a movement of a mirror of the lens set to change a movement speed of the laser irradiation position.

13. The laser welding system as recited in claim 9, wherein
the laser irradiation position moving section is configured and arranged to reduce a movement speed of the laser irradiation position from a transitional movement speed to a welding movement speed required for the laser beam to impart an amount of heat to weld the surface of the workpiece when the control unit switches from the non-welding state to the welding state.

14. The laser welding system as recited in claim 9, wherein
the laser irradiation position moving section is configured and arranged to increase a movement speed of the laser irradiation position from a welding movement speed required for the laser beam to impart an amount of heat to weld the surface of the workpiece to a transitional movement speed when the control unit switches from the welding state to the non-welding state.

* * * * *